UNITED STATES PATENT OFFICE.

ALPHONSO M. CLOVER, OF ANN ARBOR, MICHIGAN.

ANTISEPTIC COMPOUND.

No. 798,013.     Specification of Letters Patent.     Patented Aug. 22, 1905.

Application filed February 23, 1904. Serial No. 194,903.

*To all whom it may concern:*

Be it known that I, ALPHONSO M. CLOVER, a citizen of the United States, residing at Ann Arbor, in the county of Washtenaw and State of Michigan, have invented certain new and useful Improvements in Antiseptic Compounds, of which the following is a specification.

The compound is derived from succinic peroxid acid, such as described in my former patent, No. 768,561, dated August 23, 1904, and a basic substance and may be prepared in the following manner: To a freshly-prepared aqueous solution of succinic peroxid acid is added a suitable basic substance—as, for example, sodium carbonate or calcium carbonate. Where, as in the case of sodium carbonate, the added material is soluble in water, a calculated amount is added to the solution; but in case a substance insoluble in water, such as calcium carbonate, is employed an excess may be added. The reaction which takes place is illustrated in the following:

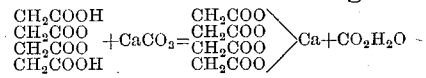

The new substance has not yet been obtained pure, owing to the hydrolytic changes which it undergoes in solution, and as a consequence its physical properties are not known. In aqueous solution it is colorless, substantially odorless, and has a powerful germicidal action. It is useful both externally and internally. Its uses internally cover infectious disorders of the alimentary tract, such as typhoid fever and cholera, and the dose is preferably two grains. Externally it is used for all forms of acute and chronic ulcers, inflammations of the mucous membranes, wounds, abrasions, and the like. It liberates iodin rapidly from potassium iodid and on being acidified with a mineral acid yields again succinic peroxid acid. The substance in aqueous solution slowly hydrolizes with the formation of the salts of succinic acid and succinic monoperacid. The solution upon long standing yields ultimately the salt of succinic acid and hydrogen peroxid.

What I claim as my invention is—

An antiseptic compound derived from succinic peroxid acid and a basic substance and which is characterized in aqueous solution by being colorless, substantially odorless, and having a powerful germicidal action: when acidified with a mineral acid it yields succinic peroxid acid; upon standing it hydrolizes with the formation of the salts of succinic acid and succinic mono-peracid and upon long standing yields the salt of succinic acid and hydrogen peroxid.

In testimony whereof I affix my signature in presence of two witnesses.

ALPHONSO M. CLOVER.

Witnesses:
    H. C. SMITH,
    JAS. P. BARRY.